(12) United States Patent
Ford

(10) Patent No.: US 7,761,390 B2
(45) Date of Patent: Jul. 20, 2010

(54) METHOD FOR INTERACTIVE COMMUNICATION AND ANALYSIS USING EMG AND EXPONENTIALLY LEVERAGED ALPHANUMERIC STRING SELECTOR (ELASS) ALGORITHM

(76) Inventor: Peter Charles Shann Hubird Ford, Ballybla House, Ashford, County Wicklow (IE)

( * ) Notice: Subject to any disclaimer, the term of this patent is extended or adjusted under 35 U.S.C. 154(b) by 578 days.

(21) Appl. No.: 10/866,183

(22) Filed: Jun. 14, 2004

(65) Prior Publication Data

US 2005/0012715 A1  Jan. 20, 2005

Related U.S. Application Data

(60) Provisional application No. 60/477,762, filed on Jun. 12, 2003.

(51) Int. Cl.
*G06F 17/00* (2006.01)
(52) U.S. Cl. ............................... 706/11; 706/4; 706/53
(58) Field of Classification Search .................. 706/4, 706/52, 53, 11
See application file for complete search history.

(56) References Cited

U.S. PATENT DOCUMENTS

| 4,109,145 | A | | 8/1978 | Graf |
| 4,951,190 | A | * | 8/1990 | Lane et al. ..................... 700/83 |
| 5,124,942 | A | * | 6/1992 | Nielsen et al. ............... 715/713 |
| 6,244,873 | B1 | | 6/2001 | Hill et al. |
| 6,381,611 | B1 | * | 4/2002 | Roberge et al. .......... 707/104.1 |

| 2003/0046254 | A1 | | 3/2003 | Ryu et al. |
| 2003/0178029 | A1 | * | 9/2003 | Hanin ......................... 128/898 |

FOREIGN PATENT DOCUMENTS

| EP | 0 468 340 A | 1/1992 |
| EP | 1 008 925 | 6/2000 |
| JP | 63-240860 A | 10/1988 |
| WO | WO 98/28678 A | 7/1998 |

OTHER PUBLICATIONS

Armando B. Barreto, PhD; Scott D. Scargle, MSEE; Malek Adjouadi, PhD ("A practical EMG-based human-computer interface for users with motor disabilities") Journal of Rehabilitation Research & Development vol. 37 No. 1, Jan./Feb. 2000 pp. 53-64 url = http://www.rehab.research.va.gov/jour/00/37/1/barreto.htm.*
The Authoritative Dictionary of IEEE Standards Terms, seventh edition. Only cover and p. 1004 are included.*
Office Action mailed Feb. 16, 2010 in corresponding Japanese Application No. 2006-533786, 2 pages, with unverified English translation, 3 pages.

* cited by examiner

*Primary Examiner*—Donald Sparks
*Assistant Examiner*—Lut Wong
(74) *Attorney, Agent, or Firm*—Foley & Lardner LLP

(57) ABSTRACT

A method, system, and software for interactive communication for a user responsive to electric signals generated by the user, includes (A) providing an interactive display to the user representative of lists of target items; (B) receiving detected electric signals generated by the user responsive to the interactive display; (C) processing and converting the detected electric signals into digital data; and (D) analyzing the digital data to associate with the user's selection one of the lists of target items presented to the user using the interactive display. Steps (A)-(D) are iteratively repeated based on a hierarchical relationship of lists of target items presented to the user to select a target item desired by the user.

12 Claims, 6 Drawing Sheets

Second ESRA Binary Leveraging Flow Chart

ESRA Virtual Analogue Realtime Signals Plotter (VARSP)
On screen graph (picture shows graphs for two channels)

Second ESRA Binary Leveraging Flow Chart

METHOD FOR INTERACTIVE COMMUNICATION AND ANALYSIS USING EMG AND EXPONENTIALLY LEVERAGED ALPHANUMERIC STRING SELECTOR (ELASS) ALGORITHM

CROSS-REFERENCE TO RELATED APPLICATIONS

This application claims the benefit of priority under 35 U.S.C § 119(e) to U.S. provisional patent application Ser. No. 60/477,762 filed on Jun. 12, 2003, the disclosure of which is incorporated herein in its entirety for all purposes.

FIELD OF THE INVENTION

This invention relates generally to an interactive communication or analysis system and method that includes displaying and analyzing a digital datastream derived from analog signals, determining a selection indication from the analyzed datastream, and performing an iterative selection based on an exponential reduction algorithm.

BACKGROUND OF THE INVENTION

One of the problems encountered involves interactive communication with disabled or handicapped persons. Such persons often do not have the abilities (for example, range of motion or movement ability) to affirmatively communicate interactively and hence require the assistance of others to perform even the most basic of all tasks such as indicate what they desire. Furthermore, since they are not able to easily express what they desire they are not able to effectively communicate with and utilize interactive devices suitable for use by disabled persons to express their desires. With the rapid increase in processing power together with a decrease in the size of such interactive devices, these interactive devices are now very feasible for disabled communication if some of the shortcomings identified above are addressed.

SUMMARY OF THE INVENTION

In one aspect, the present invention provides an interactive communication method, software, and system for a user, responsive to electric signals generated by the user, including: (A) providing an interactive display to the user representative of lists of target items; (B) receiving detected electric signals generated by the user responsive to the interactive display; (C) processing and converting the detected electric signals into digital data; (D) analyzing the digital data to associate with the user's selection one of the lists of target items presented to the user using the interactive display; and (E) iteratively repeating steps (A)-(D) based on a hierarchical relationship of lists of target items presented to the user to select a target item desired by the user.

In one aspect, the electric signals represent biologic signals generated at neuromuscular sites of the user.

In another aspect, the step of processing and converting the digital data further comprises displaying converted decimal values corresponding to the detected electric signals in a graphic display wherein the decimal value for a latest time period replaces the decimal value for an earlier time period (for example, preceding) for a rolling range of successive (or periodic) time periods displayed on the graphical display.

In a further aspect, the present invention provides a method of processing and displaying electric signals, comprising: generating a digital datastream representative of a received electric signal; generating a decimal value representative of a value of the electric signal over a time period; displaying the decimal value in a graphical display wherein a decimal value of a latest time period replaces the decimal value of an earlier (for example, preceding) time period for a rolling range of successive (or periodic) time periods displayed on the graphical display.

In a further aspect, the maximum value and minimum value for the graphic display is automatically determined based on a received maximum value and minimum value of the received electric signal over a time period or over successive time periods.

In another aspect, the present invention provides a method of interactive selection from a list of target items, including: (A) dividing the target items into n lists; (B) displaying the n lists to a user; (C) determining a user's selection of one of the n lists; (D) iteratively repeating steps (A)-(C) by using only the target items in the list selected in step (C) in step(A), until the selected list in step (C) has only 1 target item.

BRIEF DESCRIPTION OF THE DRAWINGS

The accompanying drawings, which are incorporated in and constitute a part of the specification, illustrate embodiment(s) of the invention, and, together with the general description given above and the detailed description of the embodiment(s) given below, serve to explain the principles of the invention.

DETAILED DESCRIPTION OF THE EMBODIMENTS

Figure 1:
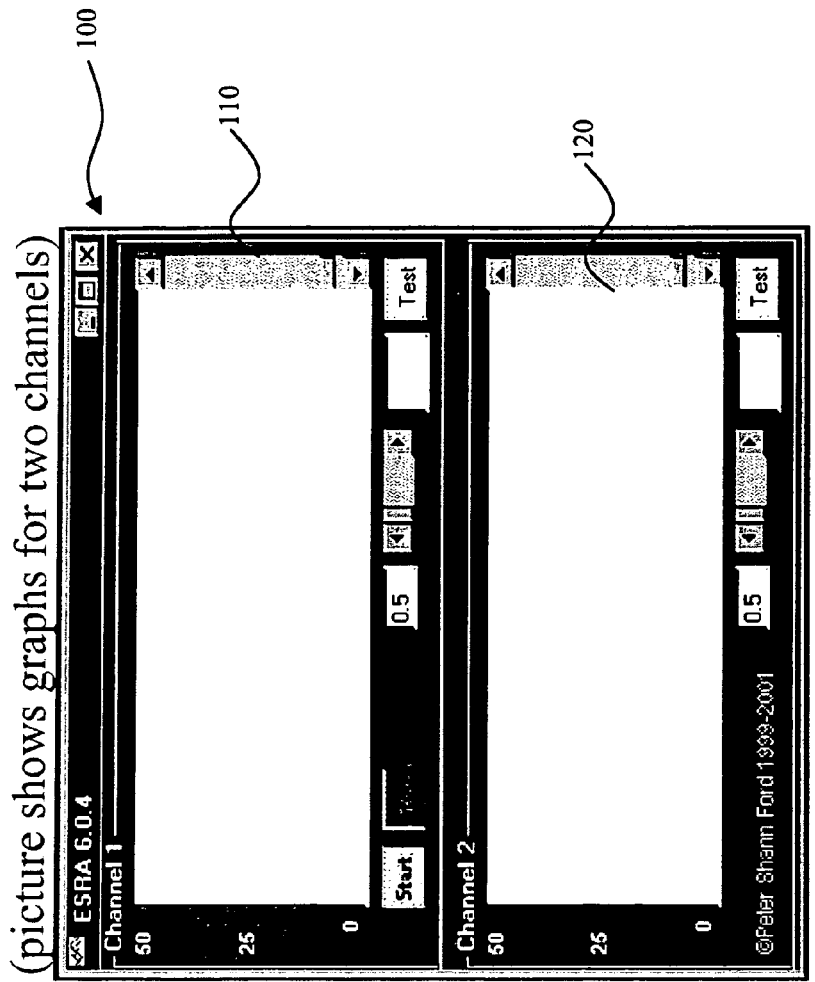
FIG. 1 shows a computer screen display used for graphical display of detected electric signals.

The present invention is directed to a method (and related system and software) for interactive communication and analysis that uses an improved display and analysis of digital data derived from analog sources, determination of a selection indication from the analysis of the digital data, and a selection system that uses the selection indication together with an exponential reduction algorithm to rapidly select a target item from a much larger list of target items.

The invention is described below with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any computer readable media for accomplishing its operations. The embodiments of the present invention may be implemented using an existing computer processor, or by a special purpose computer processor incorporated for this or another purpose.

As noted above, embodiments within the scope of the present invention include program products on computer-readable media and carriers for carrying or having computer-executable instructions or data structures stored thereon.

Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of method steps which may be implemented in one embodiment by a program product including computer-executable instructions, such as program modules, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention is suitable for being operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices As discussed earlier, in one embodiment, the present invention is directed to an interactive communication device for disabled or handicapped persons and includes the following three components: (1) Virtual Analog Real Time Signal Plotter (VARSP); (2) Exponentially Leveraged Alphanumeric String Selector (ELASS); and (3) Automated Signal Range Adjustment (ASRA). Each of these components is discussed in detail further herein. It should be recognized that while each of these components is described herein with respect to the interactive communication device (for example for a disabled or handicapped person) embodiment, they are also designed for use with a wide range of other applications that are also described further herein.

Virtual Analog Real Time Signals Plotter (VARSP)

The VARSP is designed to process and plot suitable electric signals, for example, electromyograph (EMG) signals. These signals may be received from any source, however, in one embodiment it is designed to process and utilize the uniquely arrayed datastream sent by the commercially available NeuroEDUCATOR™ EMG processor (hereafter "NeuroEducator") developed by Therapeutic Alliances, Incorporated. One skilled in the art would recognize that NeuroEducator EMG capture and processing device is just one example of an EMG capture and processing (or digitizing) device. It is contemplated that other EMG capture and processing devices may also be used instead of the NeuroEducator. Each of the four channels, for example, of the NeuroEducator polls an individual set of EMG sensors, adhered to the skin over a targeted neuromuscular site, for example, every fifty milliseconds. The NeuroEducator digitizes the analog EMG signal and renders it into hexadecimal code in a unique two-byte set that indicates the median microvolt (mV) potential drop across the center of the targeted neuromuscular site in that 50 millisecond time span. That two-byte hexadecimal set is sent by the NeuroEducator in a datastream along a cable to, for example, a nine pin serial plug, which mates with the standard COM1 port of a desktop or laptop personal computer (PC). One of skill in the art would recognize that wireless or other communication means could be used instead of the cable in alternate embodiments.

VARSP polls the COM1 port at a speed in excess of 50 kilohertz (kHz) and verifies each two-byte set of hexadecimal code before converting it into a single decimal value representing the mV reading at the targeted neuromuscular site in that 50 millisecond span.

In one embodiment, the VARSP algorithm plots a five second locus of mV readings from the datastream and updates it every 50 milliseconds in the following way. (I) It plots a five second locus, then discards the oldest mV value in the locus and adds the newest mV value. (II) It erases the old five second locus with the discarded mV value (at the beginning) and redraws the new five second locus with the newest mV value (at the end). (Ill) In this way, the graph appears to advance across the screen every 50 milliseconds.

The process is repeated every 50 milliseconds, creating the appearance of a real-time analog graph, a virtual analog real time signal that is derived from a digital datastream that is received from the NeuroEducator.

In one embodiment, the VARSP algorithm represents a linear time-based digital datastream, which naturally flows from left-to-right across a screen, as a right-to-left streaming graph with the appearance of an analog plot (or display) but one that takes advantage of the characteristic specificity and well known advantages of processing digital data.

The plotting of the VARSP graph is essential to-a real-time visual analysis of the incoming datastream, and to the ability of a user, particularly a disabled user, to assess the level of neuromuscular activity which they are endeavoring to initiate at the targeted neuromuscular site.

As would be recognized by those skilled in the art, the VARSP algorithm has applications in every area of biological and medical monitoring where the signal originates at an analog (for example, biological) site, but is converted and transmitted from the sensor in a digital datastream.

In one aspect, the VARSP algorithm (as described above) has the ability to the render any digital datastream into graphic display with all the characteristics of a real-time analog plot. For example, such digital datastreams may originate from monitoring data or telemetry from astronomical, geological, meteorological, electronic and/or mechanical sources.

In one embodiment, the present invention provides that a selection or indication signal generated by a user can be detected based on processing the received EMG signal. By varying the level of their EMG activity (measured in microvolts, for example) a person—disabled or otherwise—can initiate an "On" signal in a number of ways. One way is to make their EMG signal rise above a certain level (the "trigger line"). That level may alter dynamically for example if ELASS (as discussed below) is operating, where the Midline (as described herein, below) serves as the trigger line.

Another way (the "Delta system") is to detect a selection indication based on the EMG signal if the user makes that EMG signal change in a certain way over a set time, for example, by analyzing the rate of change over a period that may vary from two sequential value samples to an extended number of value samples. For example, in the case of sampling every 50 milliseconds, that period may vary from 51 milliseconds (two samples) to one second (19 samples) or even longer. The Delta system may vary from a simple straight line acceleration to a complex set of increases and/or decreases.

Exponentially Leveraged Alphanumeric String Selector (ELASS)

The ELASS algorithm is designed to provide highly leveraged control over alphanumeric characters and strings (or even symbols or graphic elements) with single keystrokes or EMG-originated (or other electric signal) "on" indication signal.

ELASS is a selection system that enables a user to locate a specific item (the "target item") in a list of items by iteratively reducing ("exponential reduction") the list by a fraction that has a numerator of one and a denominator of any integer (the "reduction factor"). For example with a reduction factor of two, the list will be progressively (or iteratively) reduced by halves choosing with each reduction the half containing the target item, until only the target item is left.

ELASS exploits exponential mathematics to choose (or select) a target item from a list much faster than sequential cycling which requires making a decision to choose or reject each item in the list one after the other. For example, with sequential cycling searching a list of sixty-four items can take sixty-four choices to cycle through the list to locate the target item if it is the sixty-fourth item on the list. With ELASS, using a reduction factor of two, it will always take six choices to locate the target item no matter where it appears on the list, that is if it is done through halving the remaining list on each choice in a reduction from sixty-four to thirty-two to sixteen to eight to four to two to one (six choices, since sixty-four is equal to two to the sixth power).

The ELASS exponential reduction may also occur by any other reduction factor, such as by a quarter (reduction factor of four) or by an eighth (reduction factor of eight) and so on.

ELASS employs this exponential leveraging to process lists of any length.

Since any item on a list may itself be a list, ELASS can also employ exponential leveraging in combinations. Any item in a list may itself be an additional list of any length which may in turn be reduced by exponential leveraging. For example, one skilled in the art would recognize that instead of the target item being present in each set of lists of target items displayed to a user (or selector), lists (or classes) representative of target items could be presented to the user in the initial iterations so that a larger number of items could be presented to the user over a set of iterations. In subsequent iterations, the classes could be expanded to reveal the actual list of target items to be selected by a user. In a simplified example, an initial display to the user could display the following two classes: "Food" and "Drink." In another example, the initial choice could be one of four classes: Requests, Food and Drink, Greetings, and Personal Care with the choice between the Food and Drink being presented once the "Food and Drink" choice is selected as the initial choice. Once a user has selected one of these classes (for example, "Food"), a list of target items (for example, food items or classes of food items) corresponding to the selected class could then be provided to the user for further selection. This iterative selection process (based on presented classes of target items, target items, or combinations thereof) would continue until the desired target item is selected.

The ELASS is a unique selection method that displays the lists on the computer screen (or other device display) and reduces it by exponential reduction. One skilled in the art would recognize that while the description herein refers to computer screens or displays, other selectable displays such as that on a PDA or a wireless phone or device are also within the scope of the invention described herein.

In one embodiment, using a reduction factor of two, ELASS displays each half of the target items in a respective list in a separate window (the "list window" of which there are two on the screen) on the screen, maximizing the user's ability to review every item on the lists. As the user chooses the list window displaying the list which contains the target item, ELASS erases both list windows and displays the chosen list by splitting the target items in the chosen list into two halves. Each half of the chosen list is then displayed as a separate list in its own window on the screen which displays two list windows at the same time on the computer screen. In this way, ELASS enables the user to cycle through the original list or target items until the desired target item is left in one of the two list windows on that are displayed on the screen. As this iterative process continues, the desired target item appears alone in its list window that is displayed on the computer screen. Once the desired target item is the only target item present in the list window displayed on the screen ELASS is designed to initiate a response corresponding to the particular desired target item. For example, ELASS is able to display the item in larger print on the screen, and also to convert it from text to speech through speakers or headphones. ELASS is also designed so that it can initiate a commensurate function (or even a set of functions) such as the movement of a robotic device; the control of an appliance such as an air conditioner, a light, a television, a radio or a stereo system; an email activity; an internet activity (browsing or searching); and a computer activity such as launching, operating or closing a program such as a word processor, or opening, manipulating and saving an electronic file; or even adjusting settings on the ELASS system itself so that the system can be better customized for each user.

Automated Signal Range Adjustment (ASRA) and Detection of Selection

ASRA plots the maximum EMG value (in microvolts) and the minimum EMG value (in microvolts) in a set period and adjusts the maximum Y_axis value to a new value more closely encompassing those maximum and minimum EMG values. Consequently it adjusts a Midline value (the Y-axis value) midway between the maximum EMG value sampled and the minimum EMG value sampled in that set period) which serves as a trigger for commands to be executed. One skilled in the art would recognize that the midline value need not only be the midway value but instead could be replaced by another value that lies in between the maximum and minimum EMG signal value detected (for example, a 60% or 75% threshold value between the maximum and minimum EMG value could be used instead).

In the instant that the user generates an EMG signal which exceeds the Midline or some other predetermined criteria based on the detected EMG values, a selection signal or indication signal can be generated. Some of the predetermined criteria may include, for example, a criteria related to the time based shape of the curve plotted or displayed based on the detected EMG signal values as described earlier herein. Once the selection or indication signal is detected at that instant, one embodiment of the present invention provides for executing the command choice corresponding to that instant. The command choice corresponding to that instant could be displayed or expressed by various means, for example, by computer screen graphics (for example by having a cursor or other indicator rotate between active list windows displayed on a computer screen), sounds, or a combination thereof. In certain embodiments of the present invention, ASRA enables automatically adjusting the displayed EMG range (in microvolts) corresponding to that which a particular user is capable of generating at their nerve site. This automatic adjustment removes (or reduces) the requirement for another person to manually change the range at regular intervals. Such an automatic adjustment of the displayed EMG signal range makes for a more sensitive analysis of the detected EMG signal since a more specific range of the detected EMG signal values is displayed and analyzed.

One skilled in the art would recognize, that ASRA could be used in various applications in monitoring variable range datastreams. Such application include, for example, self-regulating monitors of geological data such as escalating earthquake activity, meteorological data such as deteriorating weather or climatic conditions, or astronomical data such as pattern behavior associated with non-random events, for example, signals emanating from an intelligent source. These applications could be programmed to initiate alarms, notifications, warnings, response instructions, and similar activities or any combination of these.

Such applications also include self-regulating respondent functions such as found in fuzzy logic systems to alter the switching behavior, for example, of a microwave oven, a clothes dryer, or an air conditioner. These applications may include complex systems such as the composite orientation and state of an orbiting object such as the International Space Station to the activity of a nanotechnology device such as a plaque-clearing medbot, all of which operate in dynamic states that frequently vary with potentially critical consequences.

Such applications also include biomedical monitoring functions of elements such as vital signs, neuromuscular activity, and all detectable biological activity from whole body orientation (upright, moving, resting) to sub-molecular events (such as particle exchanges across a field or space or a change in particle characteristic).

Example of Interactive Selection from Lists of Target Items

FIG. 1 shows a computer screen 100 display in which two windows 110 and 120 are displayed in which graphs from two channels are displayed with each channel corresponding to EMG signal activity generated from biological activity detected at a neuromuscular site. As discussed above with respect to VARSP and ASRA, certain embodiments of the present invention provide that the disabled user is provided with EMG sensors at suitable neuromuscular sites (such as, for example, sensors that are compatible with the NeuroEducator EMG processor). Examples of neuromuscular sites where the sensors may be provided include every externally accessible neuromuscular site on the body (with onto-the skin sensors on the external stratum of the epidermis), for example, the surface of the skin over the biceps, or flexor or extensor muscles of the forearm, and in the case of extreme disability, the epidermis over the frontalis across the forehead. It is also to be understood that instead of the contact sensors (or in addition to), as discussed above, remote sensors based on detecting varying resistance, capacitance, magnetic field, or light transmission or reflection may also be used.

Figure 2:
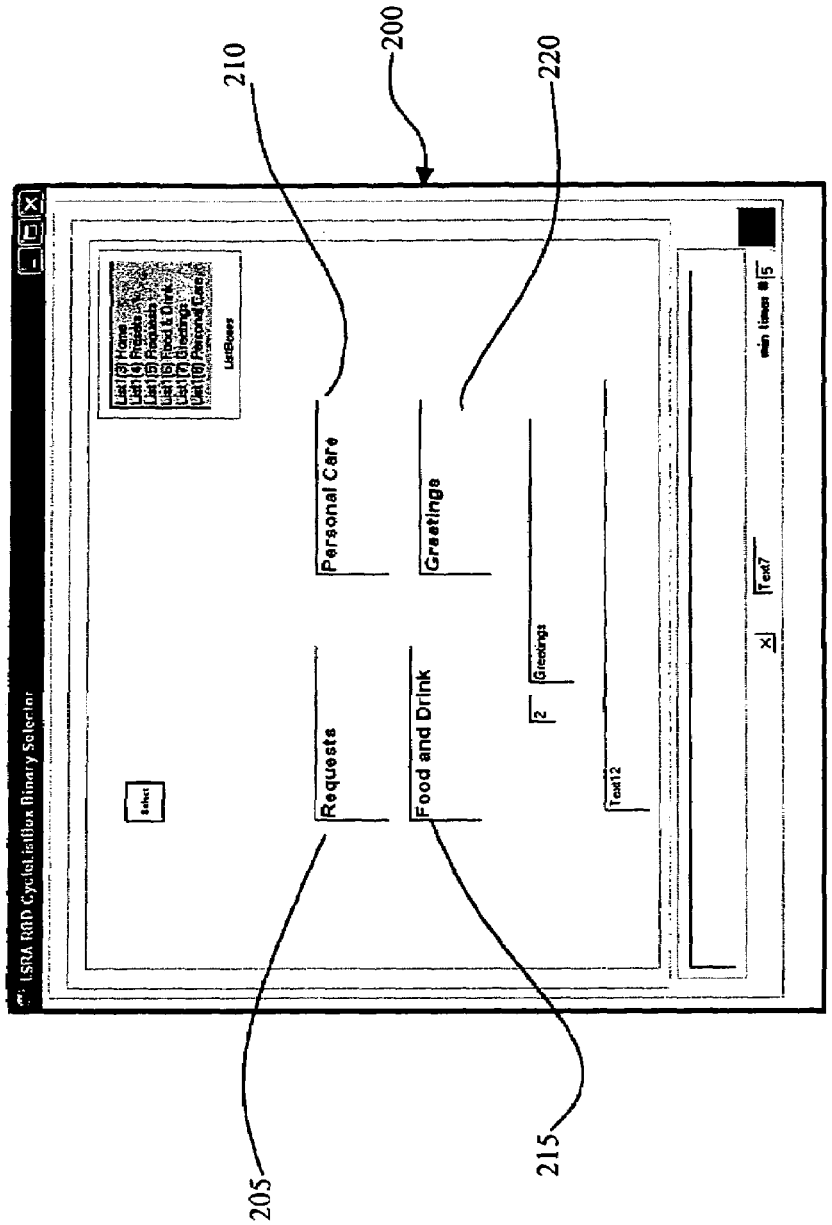
FIG. 2 illustrates an exemplary initial interactive screen.

FIG. 2 displays an exemplary initial screen 200 that is displayed to a user. The initial screen discloses four text boxes in which initial classes of target items that may be desired by a user are shown. For example, the initial classes shown include Requests 205, Personal Care 210, Food and Drink 215, and Greetings 220. A cursor or other indicator cycles through the each of the four text boxes 205, 210, 215, and 220 such that an indicator is provided to the user of which text box (and class) is active or selectable at a particular instant. Based on the EMG signal processed by the system according to certain embodiments of the present invention, a selection indication EMG signal is detected for example as discussed above with respect to ASRA. The class or text box that is highlighted by the cursor (or other indicator) at the instant at which the selection indication EMG signal is detected is considered as being selected by the user at that instant and further processing is then performed based on the selected class or text box. As shown in FIG. 2, if the selection indication EMG signal is detected when the cursor is highlighting the class or text box 220, then the "Greetings" class or text box 220 is considered to be selected by the user.

Figure 3:
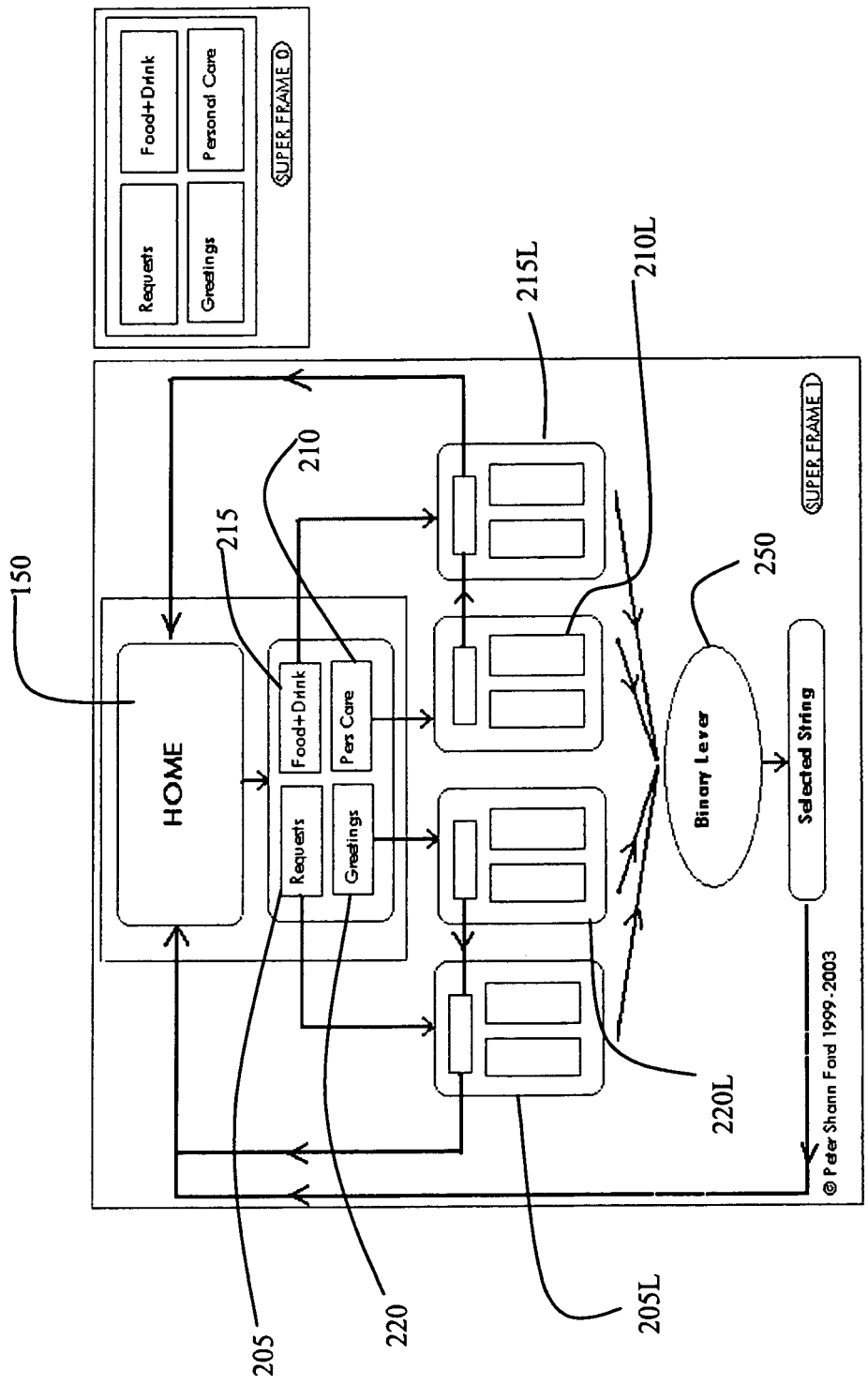
FIG. 3 is a block diagram that illustrates the relationship between the initial classes and lists of target items.

FIG. 3 is a block diagram that illustrates the relationship between the initial classes and lists of target items. The display system leads from the Home display 150 to the display of the initial classes Requests 205, Personal Care 210, Food and Drink 215, and Greetings 220. Once one of the initial classes is selected by the user, the system next displays the corresponding target item lists 205L, 210L, 215L, or 220L iteratively using a binary selector 250 until a desired target item is selected. That is, if the Requests 205 class is selected the corresponding list windows 205L are iteratively displayed. If the Personal Care 210 class is selected, the corresponding list windows 210L are iteratively displayed. If the Food and Drink 215 class is selected, the corresponding list windows 215L are iteratively displayed. Finally, if the Greetings 220 class is selected, the corresponding list windows 220L are displayed. When selected action list window is left with only one target item, then that target item is effectively selected by the user and the system then performs further processing in accordance with the selected target item. The further processing according to the selected target item could simply be a communication message communicated to another or could initiate action on some other device or system, such as, activate a robot, a computer application, or start the process of obtaining some service.

Figure 4:
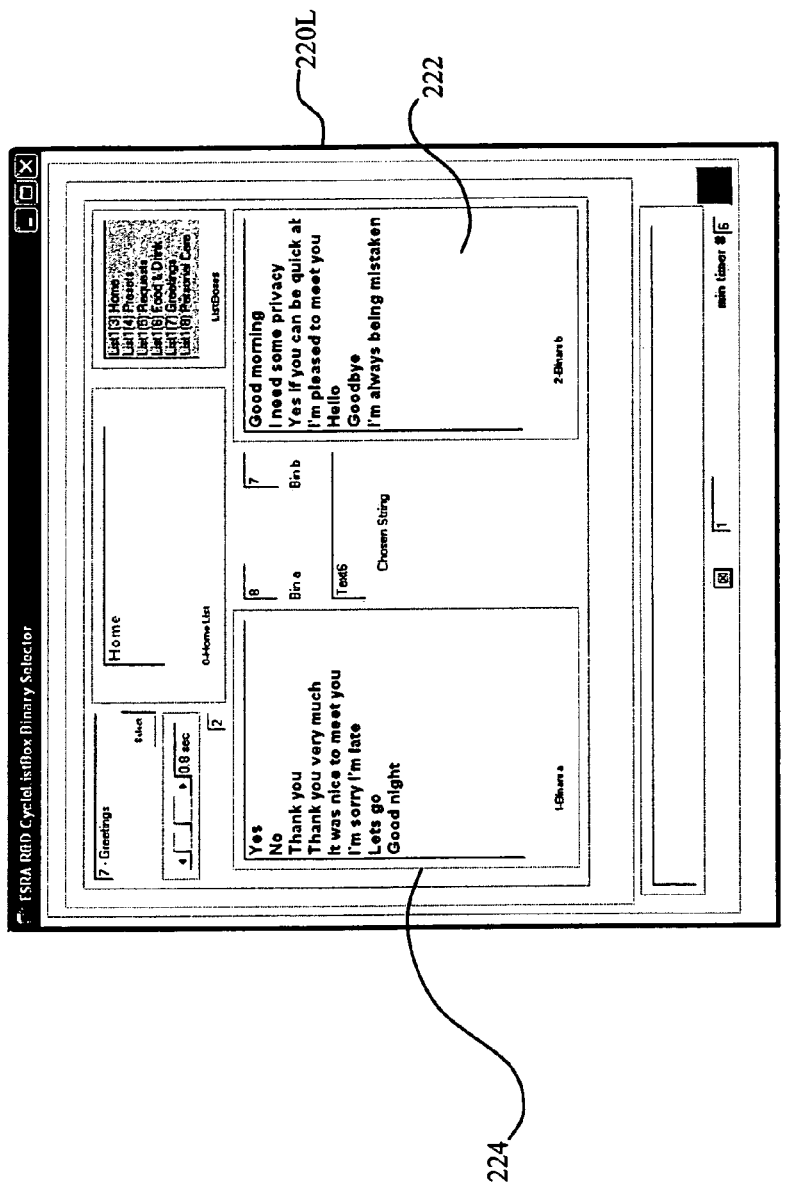
FIG. 4 is an exemplary screen showing two lists of target items.

Accordingly, when a user selects the Greetings 220 class or text box in FIG. 2, two corresponding list windows 220L are displayed to the user as shown in FIG. 4. List window 222 presents a list of six greetings while list window 224 presents a list of another six greetings while a cursor or other similar indicator cycles between the two list windows 222 and 224. Using the selection method described earlier herein, the user then selects one of the two list windows 222 or 224 based on which of the two list windows contains the desired target item (greeting). Thereafter, once the user selects one of the two list windows 222 or 224, the six target items (or greetings) are now split into two additional list windows that each contain three of the six target items. In this manner, the selection process exponentially reduces the number of the target items until a selected list window only contains one target item (i.e., the desired target item).

Figure 5:
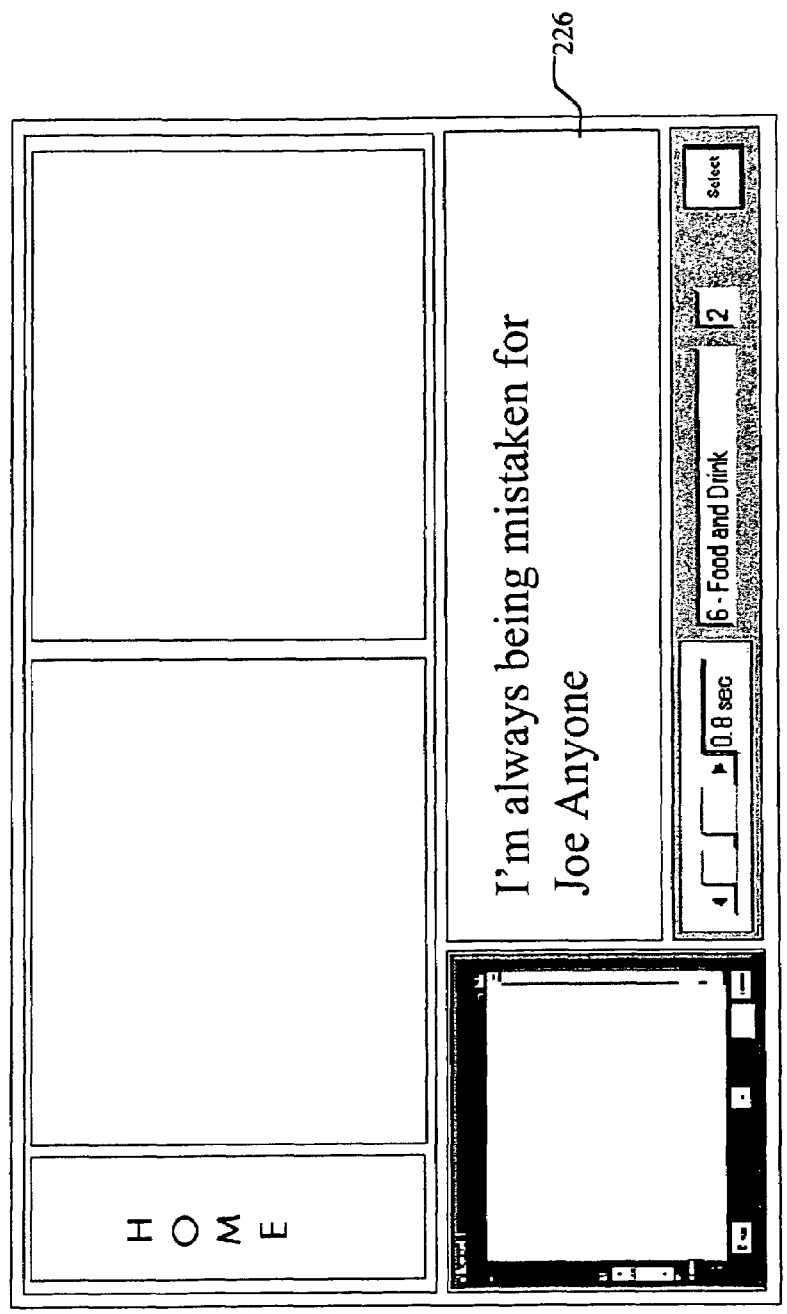
FIG. 5 is an exemplary screen disclosing a selected target item.

Therefore, as shown in FIG. 5, the list window 226 only contains one of the target items from the list of target items displayed in list window 222. One of skill in the art would recognize that using two list windows per screen (or per selection) essentially results in the traversal of a binary tree until a desired target item is found at a leaf node. One skilled in the art would also recognize, that ternary or other n-ary trees could also be used to further expedite the selection process. Of course, using a higher order tree algorithm for the selection process would also require additional list windows being displayed at the same time on a computer screen and therefore require a more burdensome decision process for the user. Therefore, for example, using a ternary tree selection algorithm would require that three list windows be displayed to a user at the same time.

Figure 6:
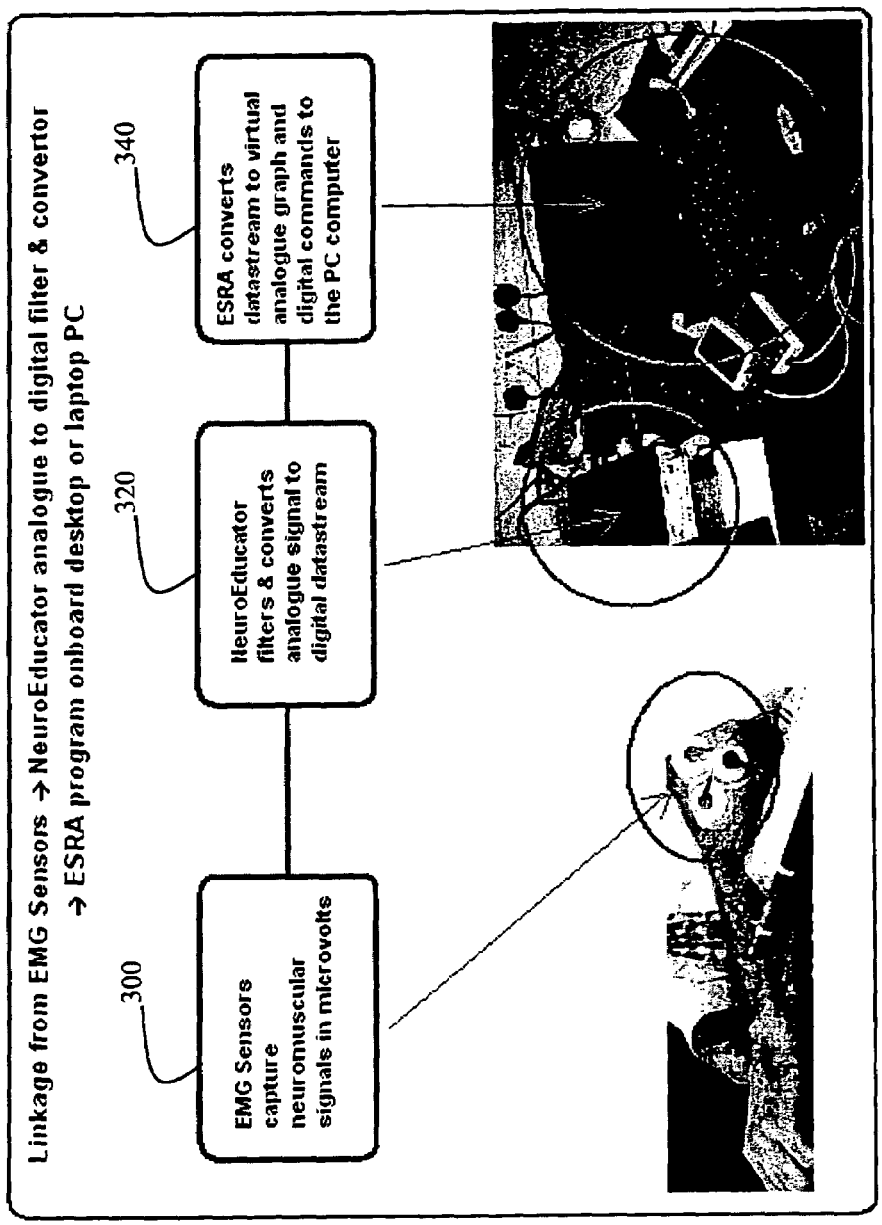
FIG. 6 is a block diagram illustrating the components of the interactive communication system of the present invention.

FIG. 6 is a block diagram of the components of the system used to implement the process steps discussed earlier herein. EMG sensors 300 capture neuromuscular signals (in mV) from sensors that are attached to neuromuscular sites in a body. As discussed above, some of the neuromuscular sites where the sensors may be attached include every externally accessible (with onto-the-skin sensors on the external stratum of the epidermis) neuromuscular site on the body, such as the surface of the skin over the biceps, or flexor or extensor muscles of the forearm, and in cases of extreme disability, the epidermis over the frontalis across the forehead. Such EMG sensors that detect neuromuscular activity are well known to those skilled in the art and are currently in wide commercial use. The EMG signals from the neuromuscular sites are transmitted to a filtering and A/D converting system 320 such as the NeuroEducator system discussed earlier herein with respect to the VARSP. The filtering and A/D converting system 320 provides a digital datastream to a computing unit as discussed earlier herein with respect to VARSP. Thereafter, the VARSP component provided within the computing unit 340 receives, processes, and displays the digital datastream as a virtual analog graph as also discussed herein with respect to VARSP. The computing unit 340 also contains the hardware and customized software that interactively provides the screen displays to the user (a display unit) so that the user can respond to the screen displays by providing biological or EMG signals that are then picked by the EMG sensors 300. The display unit also contains the software that provides the exponential reduction selection process as described earlier herein with respect to ELASS. The computing unit 340 also contains a signal processing unit that processes the received digital datastream from the filtering and A/D converting system 320, and a selection unit to determine whether the received EMG signal is indicative of a user selection of, for example, one of the list windows displayed on the screen display provided to the user by the computing unit 340.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. An interactive communication method for a user responsive to electromyograph (EMG) signals generated by the user, comprising:

(A) providing an interactive display to the user that displays a plurality of lists using an Exponentially Leveraged Alphanumeric String Selector (ELASS) algorithm at a first time, each list containing a set of target items, wherein each target item of a set is displayed to the user at the first time, and wherein a target item is an item displayed in a one of the plurality of lists and selectable by selection indication of the user, wherein the ELASS algorithm enables the user to locate the target item by iteratively reducing the lists by a fraction that has a numerator of one and a denominator of any integer;

(B) receiving detected electromyograph (EMG) signals generated by the user responsive to the interactive display at a second time;

(C) processing and converting the detected electromyograph (EMG) signals into a digital datastream;

(D) analyzing the digital datastream to detect a selection indication of the user of one of the plurality of lists of displayed target items in association with the interactive display at a third time, based on analyzing a parameter associated with the electromyograph (EMG) signal values; and (E) iteratively repeating steps (A)-(D) based on a relationship of the plurality of lists of displayed target items presented to the user to select a displayed target item desired by the user, wherein the user's selection indicates one of the plurality of lists that contains the displayed target item desired by the user.

2. The method according to claim 1, wherein the step of receiving detected electromyograph (EMG) signals comprises receiving electromyograph (EMG) signals generated at neuromuscular sites of the user, and the step of processing and converting the detected electromyograph (EMG) signals into a digital datastream comprises filtering and converting the detected electromyograph (EMG) signals into a digital datastream signal.

3. The method according to claim 2, wherein the step of receiving electromyograph (EMG) signals further comprises receiving the electromyograph (EMG) signals as a two byte hexadecimal code per time period.

4. The method according to claim 3, wherein the step of processing and converting the detected electromyograph (EMG) signals into a digital datastream further comprises converting the received two byte hexadecimal code into a single decimal value per time period.

5. The method according to claim 1, wherein the process of analyzing the digital datastream to associate with a user's selection comprises comparing the detected electromyograph (EMG) signal to a threshold value for the electromyograph (EMG) signal.

6. The method according to claim 5, wherein the threshold value comprises a midline value between the maximum and minimum detected electromyograph (EMG) values over a time period.

7. The method according to claim 1, wherein the process of analyzing the digital datastream to associate with a user's selection comprises analyzing parameters related to the shape of a graph corresponding to the detected electromyograph (EMG) values.

8. The method according to claim 7, wherein the parameters includes a slope (rate of change) of the graph.

9. The method according to claim 1, wherein the step (E) is iteratively repeated until a list selected by the user contains only one displayed target item.

10. The method according to claim 1, wherein a displayed target item in a list also represents a list.

11. The method according to claim 1, further comprising the steps of:

generating a decimal value representative of a value of the electromyograph (EMG) signal over a time period; and displaying the decimal value in a graphical display wherein a decimal value of a latest time period replaces the decimal value of an earliest time period for a rolling range of successive time periods displayed on the graphical display.

12. The method according to claim 11, wherein a maximum value and minimum value for the graphical display is automatically determined based on a received maximum value and minimum value of the received electromyograph (EMG) signal over a time period or over successive time periods.

* * * * *